May 3, 1927.
E. W. ARCHER
1,627,474
LIGHT CONTROL SYSTEM
Filed March 1, 1926
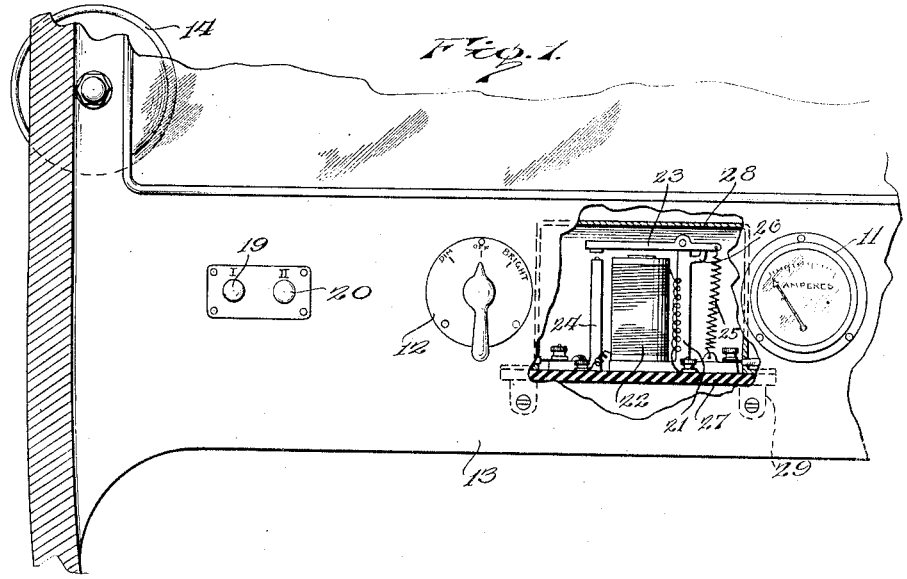
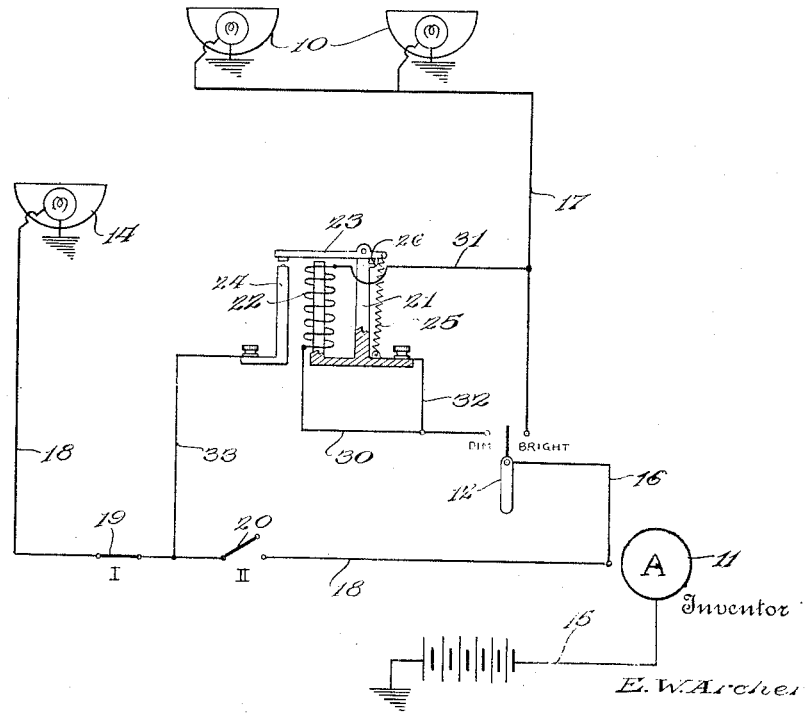
Inventor
E. W. Archer
By Lacey & Lacey, Attorneys Patented May 3, 1927.

1,627,474

UNITED STATES PATENT OFFICE.

EARL W. ARCHER, OF CAMBRIDGE, OHIO.

LIGHT-CONTROL SYSTEM.

Application filed March 1, 1926. Serial No. 91,630.

This invention relates to an improved headlight and spotlight control system for motor vehicles and seeks, among other objects, to provide a system wherein as the master switch of the system is thrown for dimming the headlights, a circuit will be automatically closed through the spotlight for energizing the spotlight.

A further object of the invention is to provide a system wherein, when the master switch is thrown for energizing the headlights at full brilliancy, the circuit through the spot light will be broken.

Still another object of the invention is to provide a system wherein the headlights may be dimmed without coincident energization of the spotlight.

And the invention seeks, as a still further object, to provide a system wherein the spotlight may be used individually without coincident energization of the headlights.

Other objects of the invention not specifically mentioned in the foregoing will appear during the course of the following description.

In the accompanying drawings:

Figure 1 is an elevation showing the switches of the system in conjunction with the instrument board of a motor vehicle, the instrument board being broken away to illustrate the relay.

Figure 2 is a diagrammatic view showing the circuit connections of the system.

Referring now more particularly to the drawings, I have, in Figure 2, diagrammatically shown a pair of conventional automobile headlights at 10 while an approved ammeter is indicated at 11. I have also shown a master switch at 12 and, as brought out in Figure 1, said switch and the ammeter are, in installing the system upon a motor vehicle, preferably mounted upon the instrument board 13 of the vehicle in the customary manner. A spotlight is indicated at 14. This spotlight may be of any approved design and, as suggested in Figure 1, may be conventionally mounted adjacent the vehicle windshield.

Leading from the battery of the vehicle or other suitable source of electrical energy thereon is a wire 15 connected to one side of the ammeter 11, and leading from the ammeter to the switch 12 is a wire 16. Leading from said switch to the headlights 10 is a wire 17 and leading from the ammeter to the spotlight 14 is a wire 18. In the present instance, I have shown the headlights 10 and spot light 14 as well as the battery of the vehicle as all having a ground connection common thereto. Controlling the circuit of the spotlight are auxiliary switches 19 and 20. These switches may be of any approved character and, as suggested in Figure 1, are preferably mounted upon the instrument board 13 of the vehicle adjacent the master switch 12. The switch 19 is normally closed while the switch 20 is normally open.

Connected in the circuit of the headlights is a relay including a bracket 21 mounting an electro-magnet having a potential coil 22, and pivoted upon the bracket is an armature 23 movable to coact with a post 24 but normally held open by a spring 25, the armature being limited in its opening movement by a stop 26 on the bracket. As shown in Figure 1, the bracket 21 and post 24 are preferably mounted upon a base 27 of suitable insulating material, and mating with the base is a cover 28 enclosing the parts. In the present instance, I have shown the relay attached to the instrument board 13 at the rear side thereof by suitable brackets 29 but, of course, the relay may be otherwise located. Furthermore, it is to be understood that the binding posts of the relay may be located outside of the cover 28 instead of inside, as shown. Leading from the switch 12 to one terminal of the coil 22 of the relay magnet is a wire 30, and connecting the other terminal of said coil with the circuit of the headlights 10 is a wire 31. Connecting the armature 23 with the circuit of the coil is a wire 32, and connecting the post 24 of the relay with the circuit of the spotlight 14 at a point between the switches 19 and 20 is a wire 33.

As will now be seen, when the switch 12 is thrown to the right, as seen in Figure 2, current will flow from the battery through the wire 15 to the ammeter 11, thence through the wire 16 and the switch 12 and through the wire 17 to the headlights for energizing the headlights at full brilliancy. However, when the switch is thrown to the left, current will then flow from the battery through the wire 15 to the ammeter, thence through the wire 16 and through the switch 12 and wire 30 to the coil 22, thence through said coil, the wire 31 and the wire 17 to the headlights. The coil 22 is such that the resistance thereof will be sufficient to restrict the flow of current to the headlights so that said headlights will be dimmed. However, the electro-magnet will be energized for swinging the armature 23 into engagement with the post 24. Thus, as the circuit is closed through the headlights, the shunt circuit through the wire 32, bracket 21, armature 23, post 24, wire 33, switch 19, and wire 18 to the spotlight will be automatically closed by the relay so that while the headlights are energized at partial brilliancy, the spotlight 14 will also be energized. By opening the switch 19 the headlights may be dimmed without the coincident energization of the spotlight while, by closing the switches 19 and 20, the spotlight may be operated independently of the headlights and independently of the control of the master switch 12. As will be perceived, upon the closing of both of the switches 19 and 20, current will flow from the battery through the wire 15 to the ammeter 11, and thence through the wire 18 and both of the switches to the spotlight for energizing the spotlight at full brilliancy.

Having thus described the invention, what I claim is:

1. In a lighting system, headlights, a primary circuit for said headlights, a secondary circuit for said headlights including a relay coil, a spotlight in a shunt circuit connected with said primary circuit and controlled by said relay coil, and a switch movable to one position for closing the primary circuit and to another position for closing said secondary circuit.

2. In a lighting system, headlights, a primary circuit for energizing said headlights at full brilliancy, a secondary circuit for energizing said headlights at partial brilliancy and including a relay coil having a resistance in the secondary circuit, a spotlight in a shunt circuit connected with said primary circuit and controlled by said relay coil, and a switch movable to one position for closing the primary circuit and to another position for closing said secondary circuit.

3. In a lighting system, headlights, a primary circuit for energizing said headlights at full brilliancy, a secondary circuit for energizing said headlights at partial brilliancy and including a relay coil forming a resistance in the secondary circuit, a spotlight in a shunt circuit connected with said primary circuit and controlled by said relay coil, and a switch movable to one position for closing the primary circuit and to another position for closing said secondary circuit.

4. In a lighting system, headlights, a primary circuit for said headlights, a secondary circuit for said headlights including a relay, a spotlight, a primary circuit for said spotlight, a shunt circuit for the spotlight connected across said primary circuits and controlled by the relay, a switch movable to one position for closing the primary circuit of the headlights and to another position for closing the secondary circuit of the headlights and energizing said relay, and a switch controlling the energization of the spotlight through said shunt circuit.

5. In a lighting system, headlights, a primary circuit for said headlights, a secondary circuit for said headlights including a relay, a spotlight, a primary circuit for said spotlight, a shunt circuit for the spotlight connected across said primary circuits and controlled by the relay, a switch movable to one position for closing the primary circuit of the headlights and to another position for closing the secondary circuit of the headlights and energizing said relay, a switch controlling the energization of the spotlight through said shunt circuit, and a switch in the primary circuit of the spotlight for closing such circuit independently of said first mentioned switch.

In testimony whereof I affix my signature.

EARL W. ARCHER. [L. S.]